July 28, 1959

J. G. LUCAS 2,896,360

COMBINATION FISH HOOK AND BAIT HOLDER

Filed Jan. 23, 1956

INVENTOR.
John G. Lucas.
BY
Fearmont Fearman
ATTORNEYS

United States Patent Office 2,896,360
Patented July 28, 1959

2,896,360
COMBINATION FISH HOOK AND BAIT HOLDER

John G. Lucas, Saginaw, Mich.

Application January 23, 1956, Serial No. 560,694

7 Claims. (Cl. 43—44.2)

This invention relates to a combination hook and bait fastener for fishing lures, and particularly to a means for releasably securing the bait in position on a hook.

One of the prime objects of the invention is to design a combination hook and bait fastener including resilient means for releasably securing bait of any kind, by merely clamping it between a spring actuated member and a hook shank, fishing spoon, or disk of any nature used when fishing.

Another object is to design a combination fishing hook and bait fastener attachment which is particularly desirable for ice fishing, in that it can be easily attached, even with cold hands and fingers, as it requires no fine threading of the bait on the hook with the consequent snagging of the fingers, etc., and the added difficulty of firmly securing the bait in position.

A further object is to provide a combination fish hook and bait fastener attachment which can be readily manufactured and assembled and which can be mass produced with the consequent saving of time and materials.

With the above and other objects in view the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
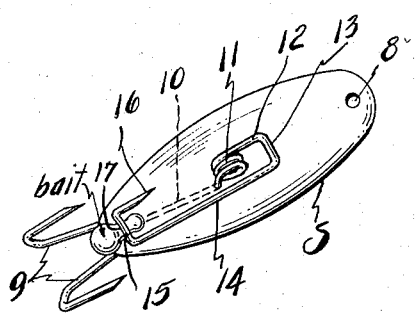
Fig. 1 is a perspective view showing one form of my invention, which includes twin hooks, a spoon and bait with means for holding the bait in position.

Referring now more particularly to the drawing in which I have shown one embodiment in several forms and combinations of my invention and with particular reference to Figs. 1 to 6 thereof wherein I have shown a conventional fishing spoon S having an opening 8 for attachment of a fishing line or leader (not shown). In Fig. 1 of the drawing I have shown twin hooks 9 soldered or otherwise secured to the spoon, the shank 10 projecting through a suitable opening to the opposite face of the spoon and being coiled as at 11 to form a spring, thence the hook stock projects upwardly as at 12 and laterally as at 13, thence downwardly as at 14, this lower end being hook-shaped to form a bait bar 15 which bears on the lower concave face of the spoon with the upturned end section sharpened as at 16 on which live or natural bait (not shown) can be impaled, this structure forming a spring pressed lever for fastening the bait in position.

The extending portions 12 and 13 form a finger rest or leverage, and by pressing inwardly to squeeze this rest portion 12 towards the spoon, the end 15 of the lever will be forced upwardly and away from the face of the spoon so that a colored bait of any kind can be secured in position, said bait being flatted on its contacting face and being grooved or channeled as at 17 to provide a surface for firm clamping engagement when the lever is released.

Figure 2:
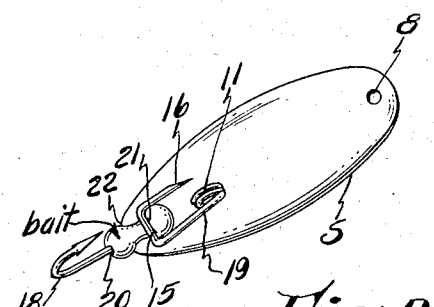
Fig. 2 is a view similar to Fig. 1, showing a single hook combination.

Fig. 2 shows substantially the same construction as Fig. 1 excepting that there is a single hook 18, and there is no upward projection or thumb rest similar to that indicated at 12 and 13 in Fig. 1. In this design the fisherman merely raises the leg 19 which is spring pressed and either inserts or removes the bait as desired, and it will also be observed that the bait can be shaped and channeled as at 20 and 21 to receive the hook shank and spoon end 22 and the bait bar 15 of leg 19 to secure it in position and eliminate any roll.

Figure 3:
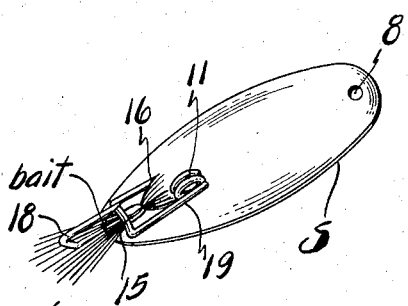
Fig. 3 is a view similar to Fig. 2, showing a different type bait fastened in position.
Figure 4:
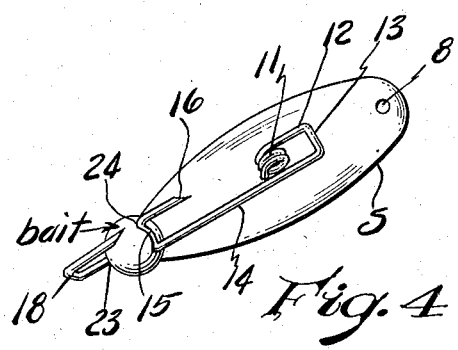
Fig. 4 is a view similar to Fig. 1 showing a single hook and a bead bait secured in position thereon.

Figs. 3 and 4 follow the constructions exemplified in Figs. 1 and 2 of the drawing, Fig. 3 being the same as Fig. 2 and showing a preferably colored yarn as a bait material, and Fig. 4 being similar to Fig. 1, excepting that it has a single hook 18 and a spherical colored bead is used as the bait, the bead being channeled as at 23 and 24 to accommodate the hook shank and the bait bar 15 of the lever leg 14.

Figure 5:
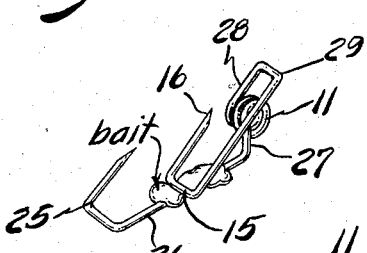
Fig. 5 is a view of a hook with the bait fastened in position thereon.

In Fig. 5 I have shown a hook 25, the shank 26 of which is upwardly bent as at 27, thence being coiled as at 11, thence the material projects upwardly as at 28, thence laterally and downwardly as at 29 to form a leg or lever, the turned end forming the bait bar 15 which bears on the shank 26 to clamp a bait such as a pork rind or the like therebetween.

Figure 6:
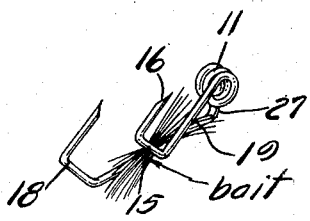
Fig. 6 is a view similar to Fig. 5 showing modified hook structure and a different type bait.

In Fig. 6 of the drawing I have shown a structure similar to Fig. 5, excepting that the thumb rest extension 13 shown in Fig. 5 is eliminated.

Figure 7:
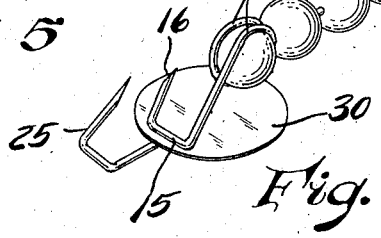
Fig. 7 is an enlarged view of a hook and disk showing the manner of releasably attaching a bead chain to the structure.

In Fig. 7 there is shown a hook 25 secured to one face of a disk 30, the shank of the hook material being turned over the upper edge of the disk and coiled as at 11, thence leading downwardly as at 19 and being turned as shown to form a bait bar 15, this bait bar bearing against one face of the disk to permit a bait (not shown) to be fastened between the bait bar 15 and the face of the disk.

Fig. 7 also shows a conventional bead chain B which can be utilized to secure the hook to a fish line or leader (not shown), the end bead of the chain being held between the two coils or convolutions of the spring 11 to secure it to the hook, and I wish to direct particular attention to the fact that this anchoring of the bead through the coil in no manner interferes with the function of fastening or releasing the bait.

While there have been shown and described particular embodiments of the invention, it will be obvious to those skilled in the art that changes and modifications can be made without departing from the invention and therefore it is aimed in the appended claims to cover all such changes and modifications as fall within the true spirit and scope of the invention.

From the foregoing description it will be obvious that I have perfected a very simple, practical, and relatively inexpensive combination hook and bait holder attachment, which can be simply and economically manufactured and which is readily operable for attaching or removal of the bait.

What I claim is:

1. A combination fish hook and bait holder, comprising a hook portion and a shank, the upper end of the shank being coiled to form a spring, thence leading downwardly and being turned, with the turned portion bearing against the shank of the hook, to yieldably hold a bait therebetween, a portion of the downwardly extending section projecting upwardy beyond the coil to form a rest to facilitate swinging said turned portion away from said shank to remove or admit the bait therebetween when downward pressure is exerted on said rest.

2. The combination defined in claim 1 in which said turned portion terminates in a sharpened end for impaling additional bait thereon.

3. A combination hook and bait holder comprising, a hook portion including a shank attached to a fishing spoon, a coiled spring section on said shank, and a downwardly extending portion leading from said spring for yieldingly clamping a bait between said downwardly extending portion and said spoon.

4. The combination defined in claim 3 in which the bait is channeled to accommodate the shank of the hook and the turned end of said downwardly extending leg portion which extends from said spring.

5. The combination defined in claim 3 in which one bead of a bead chain is inserted between a pair of convolutions of said spring.

6. A combination fish hook and bait holder comprising; a hook having a shank; a portion leading generally upwardly from said shank and connected to said shank; a section leading downwardly relative to said latter portion at an angle relative to said shank and normally forming an acute angle therewith, said section having a generally lateral portion overlying said shank and disposed generally crosswise thereto; and spring means interconnecting said downwardly leading section and said shank urging said generally lateral portion into bearing engagement with said shank so as to hold a bait therebetween; said section being liftable from a position at an acute angle with said shank to a position more nearly parallel with said shank against the force of the spring means to permit removal of the bait.

7. A combination fish hook and bait holder comprising; a hook having a shank, the hook having a hooked portion at one end leading in a generally upward direction from said shank; a portion leading generally upwardly from said shank at the other end thereof; a section leading downwardly relative to said latter portion having a generally lateral portion overlying said shank near the hooked portion on the side of said shank adjacent the hooked portion; and spring means interconnecting said shank and said downwardly leading section in such manner as to urge said generally lateral portion into bearing engagement with said shank so as to hold a bait therebetween.

References Cited in the file of this patent
UNITED STATES PATENTS

| | | |
|---|---|---|
| 2,570,468 | Matthes | Oct. 9, 1951 |
| 2,754,613 | Rogers et al. | July 17, 1956 |